United States Patent
Hugill

(10) Patent No.: US 6,931,709 B2
(45) Date of Patent: Aug. 23, 2005

(54) METHOD OF JOINING NON-METALLIC AND METALLIC COMPONENTS

(75) Inventor: Andrew Hugill, Toronto (CA)

(73) Assignee: Scintrex Limited (CN)

(*) Notice: Subject to any disclaimer, the term of this patent is extended or adjusted under 35 U.S.C. 154(b) by 81 days.

(21) Appl. No.: 10/624,206

(22) Filed: Jul. 22, 2003

(65) Prior Publication Data

US 2005/0016268 A1 Jan. 27, 2005

(51) Int. Cl.[7] .............................................. B23P 11/02
(52) U.S. Cl. ........................ 29/447; 428/34.9; 148/563; 148/402; 72/382 R; 403/28; 403/30; 403/273
(58) Field of Search .......................... 29/447, 508, 517; 428/34.9; 148/563, 402; 73/382 R; 403/28, 29, 30, 273

(56) References Cited

U.S. PATENT DOCUMENTS

| | | | | |
|---|---|---|---|---|
| 1,938,995 A | * | 12/1933 | Beynon ........................ 492/1 |
| 2,001,204 A | * | 5/1935 | Long et al. .............. 285/381.1 |
| 4,017,959 A | * | 4/1977 | Fletcher et al. ............... 29/447 |
| 4,453,106 A | * | 6/1984 | La Fiandra ................. 313/331 |
| 4,759,110 A | * | 7/1988 | Rieger et al. ................. 29/447 |
| 4,886,695 A | * | 12/1989 | Mizuno et al. ............. 428/137 |
| 5,089,312 A | * | 2/1992 | Kawase et al. ............. 428/139 |
| 5,287,613 A | * | 2/1994 | Dahl ........................... 29/447 |

FOREIGN PATENT DOCUMENTS

JP 61142024 A * 6/1986 ........... B23P/11/02

OTHER PUBLICATIONS

Wolfgang Torge, "Gravimetry" (article), *Walter de Gruyier Press*, 1989; pp. 226–237.

G. Budetta & D. Carbone; "Potential application of the Scintrex CG–3M gravimeter for monitoring volcanic activity: results of field trials on Mt. Etna, Sicily"; Reprinted from the *Journal of Volcanology and Geothermal Research 76* (1997) pp. 199–214.

Barry Block and Robert D. Moore, "Tidal to Seismic Frequency Investigations with a Quartz Accelerometer of New Geometry", *Journal of Geophysical Research*, Vo. 75, No. 8, Mar. 10, 1970, pp. 1493–1505.

Timoshenko, S.; "Strength of Materials" Vd II, p. 31, Mar. 6, 2004.

* cited by examiner

*Primary Examiner*—Jermie E. Cozart
(74) *Attorney, Agent, or Firm*—Fay, Sharpe, Fagan, Minnich & McKee, LLP

(57) ABSTRACT

A method of attaching a first member of one of quartz and a ceramic to a metal member. The method includes creating a hole in the metal member, the hole being smaller in size than the size of the first member over a temperature range, heating the metal member to a temperature sufficient to expand the hole to allow insertion of the first member in the hole, inserting a portion of the first member into the hole, and cooling the metal member to form a joined structure of the first member and the metal member.

15 Claims, 2 Drawing Sheets

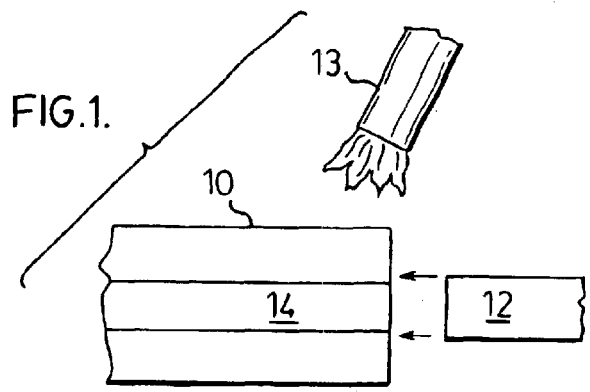
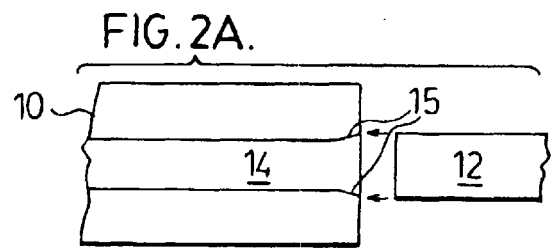 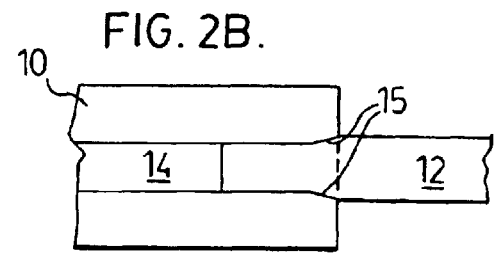
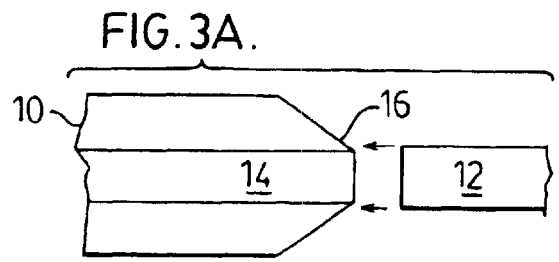 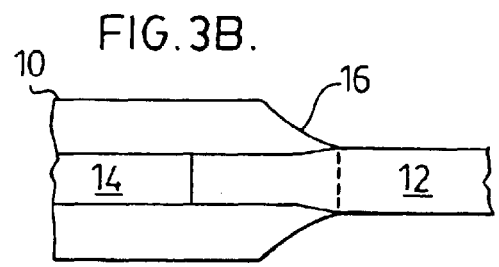
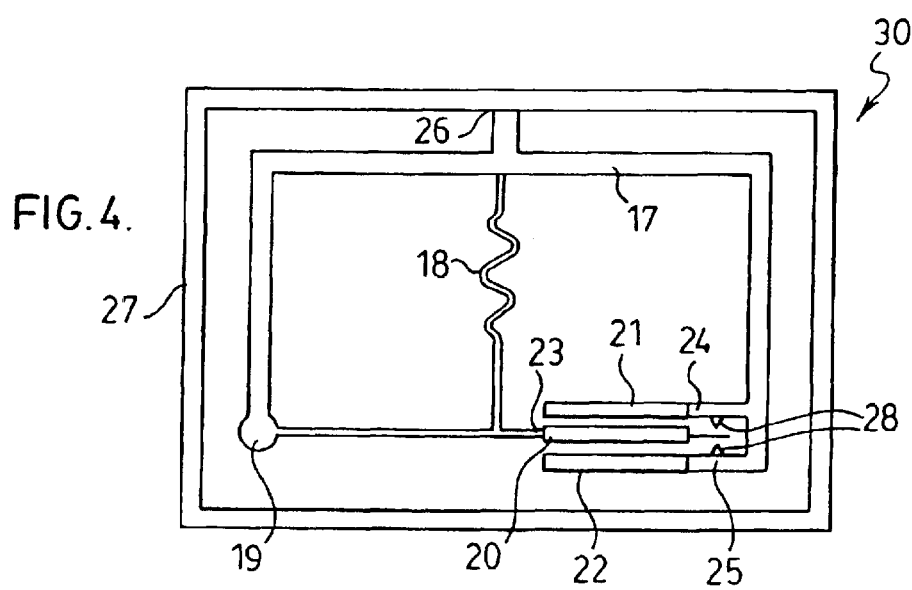

METHOD OF JOINING NON-METALLIC AND METALLIC COMPONENTS

FIELD OF THE INVENTION

The present invention relates in general to joining non-metallic and metallic components and in particular to rigid attachment of quartz and ceramic components to metal.

BACKGROUND OF THE INVENTION

The proper design and function of many devices requires rigid bonding of diverse materials. In many cases a brittle material, such as quartz or a ceramic is bonded to a metal. Adhesives can be employed for this purpose but do not allow for detachment of the two materials in the event that adjustment or maintenance is required. The use of metal clamps is unsatisfactory because of the danger of breakage of the brittle material. In addition, most metals have a very different coefficient of thermal expansion than quartz or ceramics. Thus, a clamp that is tight at one temperature can be loose at a higher temperature.

Accelerometers are devices that measure acceleration in many applications. Gravimeters (or gravity meters) are extremely sensitive and precise accelerometers that measure variations of the earth's gravitational field. Modern versions of such gravimeters can achieve relative accuracies of the order of a few micro Gals ($10^{-8}$ m/s$^2$), i.e. a few parts in $10^{-9}$ of g, the earth's mean gravitational attraction.

A full review of the design of gravimeters, both historical and current, is found in the volume Gravimetry, authored by Wolfgang Torge, Walter de Gruyter Press, Berlin-New York, 1989. Numerous designs of gravimeters have been proposed and built over the past 100 years or more. Most of these have been based on deflection, by changes in gravity, of a proof-mass that is supported by an elastic spring member. The elastic spring member can take the form of a helical spring (e.g. LaCoste-Romberg, Worden and Scintrex, as described in the Torge reference, pages 232–236) or a torsion wire (e.g. Mott-Smith, Norgaard, and Askania— Torge pages 227–228). Both metal and quartz have been employed for the material of the elastic spring in these various gravimeters. Each material has merits and shortcomings with respect to ease of manufacture and stability with time, with changes in temperature and with shock.

On the whole, quartz appears to be the preferable material for the elastic spring, due to the inherent material properties. Quartz is highly elastic and shows little mechanical hysteresis after extension or torsion. In thin fibres for springs or hinges (for highly sensitive sensors), quartz has very high strength. This permits the use of quartz fibres for springs or hinges in unclamped mode in rough field use, with no deleterious effects. This is shown in, for example, "The potential application of the Scintrex CG-3m gravimeter for monitoring volcanic activity: results of field trials on Mt. Etna, Sicily", by G. Budella and D. Carbone, Journal of Volcanology and Geothermal Research, 76 (1997)199–214. Because of its' elasticity, quartz is resistant to irreversible offsets caused by sudden shock, known as "sets". On the other hand, thin metal fibres are very prone to such sets. Also, quartz has negligible magnetic susceptibility, and thus is unaffected by strong magnetic fields, unlike ferrous metals. Quartz is also a good insulator and facilitates the electrical isolation of metallic components that is necessary in the design and proper functioning of some gravimeters. From a manufacturing standpoint, a quartz-based gravity sensor is, in some respects, easier to construct, as complex forms and attachments of other quartz components may be achieved by heat forming.

A problem arises, however, when a quartz-metal joint is required, for example to support the quartz structure, or to attach a metal component to it. It is important to the proper functioning of the gravimeter that such attachments be rigid and stable, allowing no relative movement of the quartz-metal members, while avoiding stress on the quartz during clamping, causing the quartz to shatter. Glue or mechanical clamps are two approaches commonly used to solve this problem Mechanical clamps are complex and relatively large, which makes them unsuitable for miniature components. Also it is difficult-to-distribute the required clamping force over sufficient contact surface area to prevent damage to the quartz component. This problem was clearly stated in the article "Tidal to Seismic Frequency Investigations with a Quartz Accelerometer of New Geometry", by Barry Block and Robert D. Moore, Journal of Geophysical Research, 75, No.8, Mar. 10, 1970. To achieve mechanical support of the quartz torsion fibre, Block and Moore ground the quartz to provide flat surfaces for clamping to metal components without slippage. It was determined that the surfaces had to be ground flat to within 12 microns to mate precisely with the corresponding metal surface. To reduce the possibility of breakage of the quartz, a layer of soft aluminum foil cushioned each clamp. Insertion of the soft aluminum foil reduced the rigidity and stability of the resulting joint.

A second means of creating such joints is the use of an epoxy cement or other type of adhesive. This approach has a number of disadvantages, however. At the microscopic level it does not form a stable and totally elastic bond. It is non-reversible, and does not allow for adjustment, alignment or later maintenance or repair. Epoxies also exude vapours, which contaminate the atmosphere in the gravity sensor and may adversely affect the performance of the gravimeter.

An additional problem that arises through the use of either metal clamps or cements to effect a bond is that there is a large difference in the coefficients of thermal expansion between most metals and quartz or ceramics. A joint created at one ambient temperature may become loose at a higher temperature.

There is a need for a means for rigid and stable attachment of quartz to metal in miniature quartz-element accelerometers such as gravimeters, which does not have the problems associated with mechanical clamps or glue. It is desirable that the attachment be reversible to allow detachment for the purpose of assembly, adjustment or maintenance.

A technique of attachment of a metal part to another metal part by thermal means, commonly known as "shrink-fit", is well known in the art (e.g. see Timoshenko, S. Strength of Materials 3$^{rd}$ edition 1956–68 Van Nostrand. P36, 205). In practice, this technique is usually carried out using only metal parts. The present invention exploits the difference in the coefficients of thermal expansion between the two materials being joined. In joining quartz or ceramics to metal, the two materials have very different coefficients of thermal expansion. It is this difference that presents difficulties in effecting joints through other means, such as clamping, or through the use of adhesives. Joints created in accordance with this invention are very simple in design, so are suitable for miniaturization.

SUMMARY OF THE INVENTION

In one aspect of the present invention, there is provided a method of attaching a first member of one of quartz and a ceramic to a metal member. The method includes creating a hole in the metal member; the hole being smaller in size than the size of the first member over a temperature range, heating the metal member to a temperature sufficient to expand the hole to allow insertion of the first member in the hole, inserting a portion of the first member into the hole, and cooling the metal member to form a joined structure of the first member and the metal member.

In another aspect of the present invention, there is provided a joined structure including a metal member having a hole therein and a first member of one of quartz and a ceramic inserted in the hole. The metal member exerts a compressive stress on the first member, over a temperature range.

In one aspect, the present invention provides a means of creating a rigid, reversible bond between quartz and metal, without the use of clamps or adhesives.

The present invention utilizes the differences between the coefficient of thermal expansion of pure fused silica and many ceramics and that of most metals. By utilizing this difference in coefficients, a thermal-based bond is created between the metal and quartz or ceramic without the complexities and detrimental effects associated with metal clamps and glues.

BRIEF DESCRIPTION OF THE DRAWINGS

The present invention will be better understood with reference to the following description and the drawings, in which:

FIG. 1 is a partial sectional side view of a quartz member being joined with a metal member, in accordance with an embodiment of the present invention;

FIGS. 2A and 2B are partial section side views of the quartz member being joined with the metal member of FIG. 1, showing a preferred geometry of the metal member;

FIGS. 3A and 3B are partial sectional side views of the quartz member being joined with the metal member of FIG. 1, showing another preferred geometry of the metal member; and FIG. 4 is a schematic diagram of a gravimeter in which a quartz member and metal member, joined in accordance with the embodiment of FIG. 1, are employed for parts thereof.

DETAILED DESCRIPTION OF THE PREFERRED EMBODIMENTS

Figure 5:
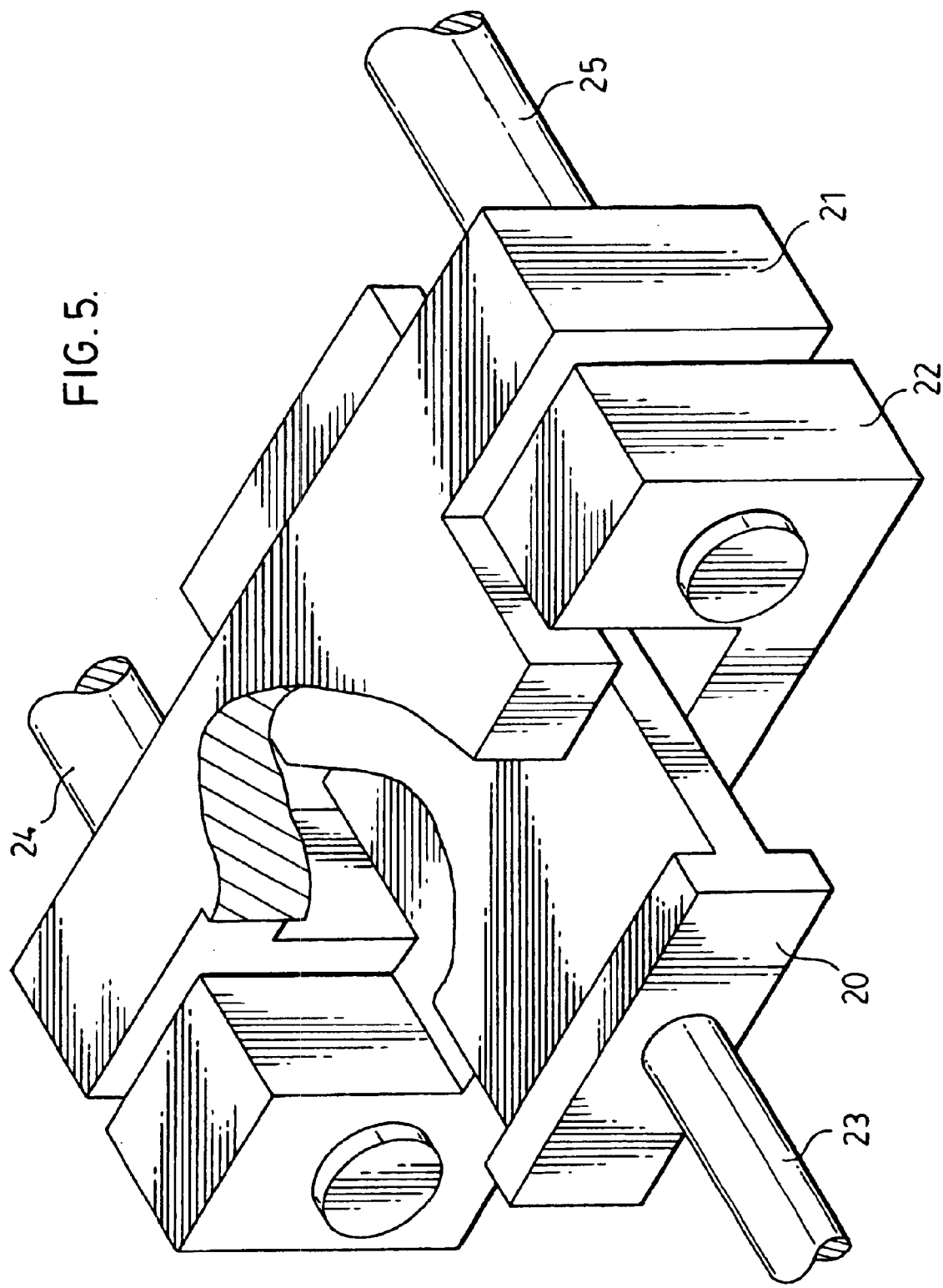
FIG. 5 is a perspective view of a portion of the gravimeter of FIG. 4, drawn to a larger scale.

For ease of illustration only, the present discussion is directed to improvements in the design of quartz element gravimeters. It will be understood that the present invention is not limited to quartz element gravimeters, however. It will be appreciated that ceramic-elements can also be used and that the present invention is also applicable to accelerometers used for other purposes such as seismometry.

Table 1, included below, includes a list of coefficients of thermal expansion of quartz, ceramics and metals that are commonly employed in the design of various devices. Clearly there is at least an order of magnitude difference in the coefficient of thermal expansion between quartz and all the metals that are commonly employed in the construction of a typical gravity sensor. There is also a significant difference between the coefficients of thermal expansion for ceramics and most metals, although to a lesser degree than the difference between the coefficients of thermal expansion of quartz and metals.

TABLE 1

Coefficient of Thermal Expansion of Materials

| Material | Coefficient (ppm/° C.) |
| --- | --- |
| Quartz | 0.6 |
| Ceramics | 3–5 (typical) |
| Copper | 16.7 |
| Aluminium | 23.8 |
| Gold | 14.3 |
| Stainless steel | 10.5 |
| Invar | temperature dependent (typically 1–2 (at 20° C.) to 16 (at 350° C.)) |

Referring first to FIG. 1, a metal member is shown and indicated generally by the numeral 10. The metal member 10 is machined to create a hole 14 for attachment of a quartz member 12, also referred to as a quartz rod. A heat source 13 is provided for increasing the temperature of the portion of the metal member 10 that surrounds the hole 14.

FIGS. 2A and 2B illustrate the quartz member 12 being joined with the metal member 10, showing a preferred geometry of the metal member 10. The metal member 10 is, machined such that the mouth of the hole 14 includes a taper 15. FIGS. 3A and 3B illustrate the quartz member 12 being joined with the metal member 10, showing an alternative geometry of the metal member 10. In this geometry, the metal member 10 includes a tapered portion 16, such that the metal member 10 is tapered towards the mouth of the hole 14.

In each of FIGS. 1, 2 and 3, the quartz member 12 is substantially cylindrical, in the form of a rod with circular cross-section of uniform radius. The hole 14 is machined in the metal member 10 such that the diameter of the hole 14 is rigidly controlled to be a predetermined amount less than the diameter of the quartz member 12, over a range of operating temperatures for a sensor. The metal member 10 is then heated by the heat source 13. Suitable heat sources include a flame, heating in an oven, or other suitable means. The metal member 10 is heated to a temperature well above the operating temperature range of the sensor, to the point where expansion of the metal member 10 allows the quartz member 12 to be inserted into the hole 14. The quartz member is then inserted into the hole 14 of the metal member 10. On cooling of the metal member 10, the metal member 10 shrinks and the quartz member 12 is firmly clamped by the metal member 10, thereby providing a rigid joint. If desired, the joint is heated, causing expansion of the metal member 10 to allow the quartz member 12 to be removed. Although both the quartz member 12 and the metal member 10 are heated to the same temperature, the metal member 10 expands more than the quartz member 12. Thus, the diameter of the hole 14 increases more than the diameter of the quartz member 12 and, at a sufficiently high temperature, the quartz member 12 is withdrawn from the hole 14 of the metal member 10.

For some applications it may be a more expedient and better controlled procedure to heat both the quartz and metal member to a common temperature in order to make the joint. In this case, the common temperature that the quartz and metal members are heated to, is the same high temperature used for the removal of the quartz member.

The following examples are submitted to further illustrate embodiments of the present invention. These examples are intended to be illustrative only and are not intended to limit the scope of the present invention.

EXAMPLE 1

In the present example, a quartz member 12 is joined to a copper metal member 10. The quartz member 12 has a diameter of X, and the hole 14 drilled in the metal member 10 has a diameter of 0.998X. The copper metal member 10 is heated slightly more than 120° C. above ambient temperature, causing an increase in the diameter of the hole 14 by 0.2% and the quartz member 12 is then inserted into the enlarged hole 14. To release the quartz member 12 from the copper metal member 10, the temperature at the joint is heated to a slightly higher temperature, namely above 125° C. above ambient temperature. The difference in temperature accounts for the fact that both the quartz member 12 and the metal member 10 are heated, and that the difference in thermal coefficients of expansion between these two materials is about 16 ppm/° C.

EXAMPLE 2

In this example, Invar is employed. Invar is an alloy of iron metal with unusual thermal properties. As shown in Table 1, invar has a very low coefficient of thermal expansion ($\sim 1-2 \times 10^{-6}$) in the usual range of ambient operating temperatures (0° C. to +45° C.). This is desirable for stable operations. However, when heated the coefficient of thermal expansion rises, increasing ten fold when the temperature reaches 400° C., which thus allows the invar to be joined to quartz and ceramic components, in accordance with an embodiment of the present invention.

In constructing the quartz-metal joint shown in FIG. 1, it is desirable to inhibit undue tensile stress gradients on the surface of the quartz member 12 when the metal member 10 contracts in order to avoid breakage of the quartz member 12. The maximum tensile stress gradient on the surface of the quartz member 12 occurs at the open end of the hole 14, between the compressed and non-compressed portions of the quartz member 12. The geometries shown in FIGS. 2 and 3 are illustrative of two means of reducing tensile stress gradient on the surface of the quartz member 12. In FIG. 2A, this is accomplished by machining a smoothly tapered mouth of the hole using the taper 15, where the diameter at the mouth of the hole is equal to the diameter of the quartz member 12 at a typical operating temperature. Thus, the mouth of the hole 14 is greater in diameter than that of the quartz member 12 when the metal member 10 is heated. When the quartz member 12 is inserted and the metal member 10 cools (FIG. 2B), there is no stress on the quartz member 12 at the mouth of the hole 14. The diameter progressively and smoothly changes along quartz member 12 into the hole 14 and thus reduces the tensile stress gradient on the surface of the quartz member In FIG. 3A, the metal member 10 is formed to include a tapered portion 16 about the mouth of the hole, the diameter of which is finely tapered to the diameter of the hole 14. The metal member 10 is heated and the quartz member 12 is inserted into the hole 14, as described above. As the metal member 10 cools and contracts (FIG. 3B), the lip of the hole 14 is deformed outwardly (in a bell-like manner), thereby reducing the tensile stress gradient on the surface of the quartz member 12 in the region of the mouth of the hole 14.

FIG. 4 is a schematic diagram of a gravimeter 30 in which the quartz member 12 and the metal member 10, joined in accordance with the embodiment of FIG. 1, are employed for parts thereof. The gravimeter 30 includes a rigid quartz frame 17 supporting a gravity sensing device including a quartz spring 18, a quartz hinge 19, a proof-mass 20, supported by a support 23 connected to both the spring 18 and the hinge 19. Two metal plates 21, 22 are disposed on each side of the proof-mass 20 and are each supported by a respective support 24, 25. Quartz to metal joints are employed at several locations including: the support 23 to the proof-mass; the supports 24, 25 to the supporting quartz frame for the metal plates 21, 22; the point 26 at which the sensor assembly is attached to the metal enclosure 27, and at supports for stops 28, which are metal stops designed to limit the range of movement of the proof-mass 20. In order for the gravity sensor to operate properly, the proof-mass 20 is electrically conductive, preferably made of metal. This proof-mass 20 acts as one plate of each of two capacitors, with plates 21 and 22 respectively as the other plates of these capacitors. The two capacitors are measured in a capacitance bridge and act as a sensitive method of sensing the position of the proof-mass 20. The imbalance signal from the capacitance bridge is rectified to create an electrostatic feedback force, which is applied across the outer metal plates 21, 22 to restore the proof-mass 20 to a horizontal position. To sense the position of the proof-mass 20 with sufficient precision in order to have a resolution and stability of the order of $10^{-9}$ g, the geometry of plates 21 and 22 and the proof-mass 20 must be established and maintained to the same order, effectively a few A°.

FIG. 5 shows a perspective view of a portion of the gravimeter, according to one embodiment of the present invention, showing the positioning of the outer metal plates 21, 22 in greater detail. As shown, the outer metal plates 21, 22 are rigidly positioned, in parallel juxtaposition, through the supports 24, 25, which are quartz and attach to the frame 17 (FIG. 4) of the gravimeter. In this embodiment each of the outer metal plates 21, 22 is joined to both quartz supports 24, 25, thus providing a high level of stability in the relative positions of the two plates 21, 22. The support 23 is also a quartz member and is attached to the metal proof mass 20 through an edge that has an increased thickness to accommodate a hole, into which the quartz member 23 is inserted.

Thus, the design of the gravimeter 30 employs the junction of quartz to metal at several locations, e.g. at the support 23 to the proof-mass 20, at the supports 24 and 25 for the plates 21 and 22, at the point 26, which is the basic point of attachment of the whole sensor assembly to the metal enclosure 27, and at the supports for the stops 28, which limit the range of travel of the proof-mass 20. Moreover, it is important to inhibit long-term drift or shock-induced slippage. The quartz member 12 to metal member 10 joint of the present embodiment enables these conditions to be met.

For the purpose of the present invention, the quartz member 12 of the joint is of uniform diameter and of circular cross-section, for the optimum function. If the basic quartz structure is not in this desired form, a section of right-circular quartz cylinder is fused to the quartz structure at the desired connection point, thereby providing the circular cross-section quartz member 10 for the joint.

Although the present invention is described as having particular application to the design and construction of gravimeters incorporating quartz elastic members, it is equally applicable to quartz-metal joints, and ceramic-metal joints in other accelerometers and devices for other applications. It should be noted that the difference in the coefficient of thermal expansion between ceramics and metals is less than that between quartz and metals (e.g. 13 vs. $16 \times 10^{-6}$). Thus, the temperature to which the metal member is raised for release of the ceramic rod is proportionately higher than the temperature to release the quartz in the case of the quartz-metal joint.

It will be understood that the present invention has been described by way of example and modifications and variations to the embodiments described herein may occur to those skilled in the art. All such modifications and variations are believed to be within the sphere and scope of the present invention.

What is claimed is:

1. A method of attaching a first member of one of quartz and a ceramic to a metal member to form a joined structure, the first member being a substantially cylindrical member, the method comprising:

creating a hole of substantially circular cross-section in said metal member, the hole having a diameter that is smaller in size than the diameter of the first member over a temperature range of the joined structure in use;

heating the metal member to a temperature sufficient to expand the hole to allow insertion of said first member in the hole;

inserting a portion of said first member into said hole; and cooling the metal member to form the joined structure of the first member and the metal member, wherein forming said hole further comprises forming a hole having a diameter that smoothly and progressively reduces in diameter toward the interior thereof, from a diameter at a mouth of the hole of at least the diameter of the first member over said temperature range to said diameter that is smaller in size than said first member in the hole, thereby reducing tensile stress gradients in the first member of the joined structure.

2. A method of attaching a first member of one of quartz and a ceramic to a metal member to form a joined structure, the first member being a substantially cylindrical member, the method comprising:

creating a hole of substantially circular cross-section in said metal member, the hole having a diameter that is smaller in size than the diameter of the first member over a temperature range of the joined structure in use;

heating the metal member to a temperature sufficient to expand the hole to allow insertion of said first member in the hole;

inserting a portion of said first member into said hole; and cooling the metal member to form the joined structure of the first member and the metal member, wherein said metal member comprises a metallic proof mass and said first member comprises a portion of a quartz structure of a gravity sensor.

3. A method of attaching a first member of one of quartz and a ceramic to a metal member to form a joined structure, the first member being a substantially cylindrical member, the method comprising:

creating a hole of substantially circular cross-section in said metal member, the hole having a diameter that is smaller in size than the diameter of the first member over a temperature range of the joined structure in use;

heating the metal member to a temperature sufficient to expand the hole to allow insertion of said first member in the hole;

inserting a portion of said first member into said hole; and cooling the metal member to form the joined structure of the first member and the metal member, wherein said metal member comprises an adjustable stop for limiting range of movement of a proof mass in a gravity sensor.

4. The method of claim 3, wherein creating said hole further comprises creating said hole such that the diameter of the first member and the diameter of the metal member differ by about 0.1% to about 0.3% of the diameter of the first member.

5. The method of claim 3, further comprising forming a finely tapered lip in the metal member about the mouth of said hole, prior to inserting said portion of said first member.

6. The method of claim 5, wherein said cooling causes deformation of the lip of said metal member about said mouth of said hole, thereby reducing tensile stress gradients in the first member of the joined structure.

7. A method of attaching a first member of one of quartz and a ceramic to a metal member to form a joined structure, the first member being a substantially cylindrical member, the method comprising:

creating a hole of substantially circular cross-section in said metal member, the hole having a diameter that is smaller in size than the diameter of the first member over a temperature range of the joined structure in use;

heating the metal member to a temperature sufficient to expand the hole to allow insertion of said first member in the hole;

inserting a portion of said first member into said hole; and cooling the metal member to form the joined structure of the first member and the metal member, wherein said metal member comprises at least a portion of an enclosure and supports for a gravity sensor.

8. The method of claim 7, wherein creating said hole further comprises creating said hole such that the diameter of the first member an the diameter of the metal member differ by about 0.1% to about 0.3% of the diameter of the first member.

9. The method of claim 7, further comprising forming a finely tapered lip in the metal member about the mouth of said hole, prior to inserting said portion of said first member.

10. The method of claim 9, wherein said cooling causes deformation of the lip of said metal member about said mouth of said hole, thereby reducing tensile stress gradients in the first member of the joined structure.

11. A method of attaching a first member of one of quartz and a ceramic to a metal member to form a joined structure, the first member being a substantially cylindrical member, the method comprising:

creating a hole of substantially circular cross-section in said metal member, the hole having a diameter that is smaller in size than the diameter of the first member over a temperature range of the joined structure in use;

heating the metal member to a temperature sufficient to expand the hole to allow insertion of said first member in the hole;

inserting a portion of said first member into said hole; and cooling the metal member to form the joined structure of the first member and the metal member, wherein said metal member comprises a metallic proof mass and said first member comprises a portion of a structure of a gravity sensor.

12. The method of claim 11, wherein creating said hole further comprises creating said hole such that the diameter of the first member and the diameter of the metal member differ by about 0.1% to about 0.3% of the diameter of the first member.

13. The method of claim 11, further comprising forming a finely tapered lip in the metal member about the mouth of said hole, prior to inserting said portion of said first member.

14. The method of claim 13, wherein said cooling causes deformation of the lip of said metal member about said mouth of said hole, thereby reducing tensile stress gradients in the first member of the joined structure.

15. The method of claim 11, wherein said metal member comprises invar.

* * * * *